United States Patent [19]

Piskoti

[11] Patent Number: 4,797,445

[45] Date of Patent: Jan. 10, 1989

[54] NON-TRANSFERRING DRY-FILM MOLD RELEASE AGENT

[75] Inventor: Charles Piskoti, Grand Blanc, Mich.

[73] Assignee: Genesee Polymers Corporation, Flint, Mich.

[21] Appl. No.: 180,628

[22] Filed: Apr. 4, 1988

Related U.S. Application Data

[63] Continuation of Ser. No. 925,466, Oct. 30, 1986, abandoned, which is a continuation of Ser. No. 715,507, Mar. 26, 1985, abandoned.

[51] Int. Cl.$^4$ .............................................. C08L 83/00
[52] U.S. Cl. ............................... 524/588; 524/860; 525/477; 528/17; 528/34
[58] Field of Search ................. 528/17, 34; 525/477; 524/588, 860

[56] References Cited

U.S. PATENT DOCUMENTS

| | | | |
|---|---|---|---|
| 3,305,502 | 2/1967 | Lampe | 528/17 |
| 3,334,067 | 8/1967 | Weyenberg | 528/17 |
| 3,350,330 | 10/1967 | Cash et al. | 528/17 |
| 3,485,780 | 12/1969 | Sterman et al. | 528/17 |
| 4,100,129 | 7/1978 | Beers | 528/17 |
| 4,318,939 | 3/1982 | Wong | 528/17 |

FOREIGN PATENT DOCUMENTS

| | | |
|---|---|---|
| 0144167 | 7/1984 | European Pat. Off. |
| 2039287 | 8/1980 | United Kingdom ................. 528/17 |

*Primary Examiner*—Melvyn I. Marquis
*Attorney, Agent, or Firm*—Reising, Ethington, Barnard, Perry & Milton

[57] ABSTRACT

A method of preparing an organo-alkoxy substituted silicone resin including the steps of reacting an organo-silicone resin containing hydroxy terminated functional groups with an alkoxy silane in the presence of catalytic amounts of a titanate compound and incubating the mixture to derive the organo-alkoxy substituted silicone product and an hydroxylated biproduct. The organo-alkoxy substituted silicone product may be reacted with a hydroxy functional fluid in the presence of catalytic amounts of a titanate compound to derive a non-transferable, semipermanent release agent.

15 Claims, No Drawings

NON-TRANSFERRING DRY-FILM MOLD RELEASE AGENT

This application is a continuation of application Ser. No. 925,466, filed 10/30/86, now abandoned, which is a continuation of Ser. No. 715,507, filed 3/26/85, now abandoned.

BACKGROUND OF THE INVENTION

The instant invention relates to polymeric organosilicone compounds and more particularly, to organoalkoxy substituted silicone resins.

TECHNICAL FIELD

Silicone resins may be used as additives for paints or alone as high temperature paint coatings. The resins have unusual heat stability when cured, resistance to oxidation and corrosive chemicals and are retentive of dielectric properties in high temperature service. The resins may also be used as release coatings, such as release coatings for molds.

Generally, a silicone resin dissolved in a solvent is mixed with a catalyst. Silicone resins are organosiloxane polymers supplied as solids or in solution. The article to be coated is either sprayed with the silicone resin or dipped in a silicone resin bath and then baked at high temperatures.

Silicone resins include hydroxy-terminated functional groups are commonly used in the aforementioned processes. Examples of such resins are Dow Corning Z-6018, General Electric SR542, SR545, SR350, SR355, SR882, SR182 and Owen Illinois 650, 908, 950, and 630. These resins are quite reactive and must be stored separately from catalyst. Because of the high reactivity of these resins, these resins have a poor shelf life. This is especially true for the methyl resins. The instant invention provides a method of substituting the hydroxyl groups of certain silicone resin with alkoxysilanes thereby providing a stable silicone resin having a significantly increased shelf life. Upon application of the resin to an article, the resin is subjected to moisture of the surrounding atmosphere thereby causing catalytic condensation and curing of the resin.

SUMMARY OF THE INVENTION

The instant invention provides a method of preparing an organoalkoxy substituted silicone resin, the method including the steps of reacting an organo-silicone resin containing hydroxy-terminated functional groups with an alkoxysilane in the presence of catalytic amounts of a titanate compound and incubating the mixture to derive the organoalkoxy substituted silicone product and a hydroxylated biproduct. The instant invention further provides the organoalkoxy substituted silicone resin product.

DESCRIPTION OF THE PREFERRED EMBODIMENTS

The instant invention provides a method of preparing an organoalkoxy substituted silicone resin generally including the steps of reacting an organo-silicone resin containing hydroxy-terminated functional groups with an alkoxysilane in the presence of catalytic amounts of a titanate compound and incubating the mixture to derive the organoalkoxy substituted silicone product and a hydroxylated biproduct.

The organo-silicone resin is characterized as a three dimensional trifunctional siloxane polymer with each silicon atom of the siloxane (Si-O) backbone sharing three oxygen atoms with an adjacent silicon atom having a predetermined percentage of hydroxyl-terminated functional groups by weight, exemplified by the following resins: Dow Corning Z-6018; General Electric SR542, SR545, SR350, sR355, SR882, SR182, and Owen Illinois 650, 908, 950 and (having varying percent solids by weight solution of silicone resin contents and varying hardnesses, each having an abundance of hydroxyl groups).

The alkoxysilanes are of the general formula;

$R_{1n}\text{—Si(OR}_2)_{4-n}$ wherein $R_1$ and $R_2$ are monovalent substituted or unsubstituted organic radicals which may be aliphatic and aromatic hydrocarbon organic radicals as well as mixtures thereof and n=1 or 2. For example, the organo functionality of the silanes may be epoxy, methacryloxy, mercapto, or other aliphatic or aromatic hydrocarbon substitutions of the orthosilicate functionality. Dow Corning Z-6040 is an example of an epoxy silane.

The titanate compound may be chosen from the group of tetraorthotitanates. Preferably, tetraisopropyltitanate or tetraisobutyltitanate are used.

The organo-silicone resin/alkoxysilane incubation is carried out in a moisture free atmosphere. For example, the incubation may be carried out in a nitrogen atmosphere. Once reacted, the product is maintained in a moisture free (and thereby inert) atmosphere until curing is desired. The product is significantly more stable than the precursor silicone resin.

The incubation of the organo-silicone resin and alkoxysilane may take place in the presence of heat. A temperature of between 50° C. to 90° C. may be utilized during the incubation of the reactants. The precise temperature and period of incubation are directly dependent upon each other, as well as the specific reactants and catalyst utilized.

The reaction of the organo-silicone resin and alkoxysilane is carried out until there is complete substitution of the hydroxy functionality with the alkoxy moieties. The decrease in hydroxy functionality can be determined by infrared spectrometry. The hydroxylated organo biproduct may be removed and the organoalkoxy substituted product cured in the presence of atmospheric moisture.

The organoalkoxy substituted silicone product, in the presence of catalytic amounts of the titanate compound, may be reacted with a hydroxy functional fluid corresponding to the formula:

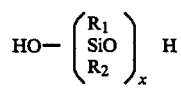

$$\text{HO}-\left(\begin{array}{c}R_1\\ \text{SiO}\\ R_2\end{array}\right)_x\text{H}$$

wherein $R_1$ and $R_2$ are monovalent organic radicals selected from the group consisting of aliphatic and aromatic hydrocarbon organic radicals as well as mixtures thereof and x is in integer from 10 to 100. The fluid is generally characterized as an organosiloxane polymers including hydroxy functionality. A resin/fluid copolymer is derived and a hydroxylated organo biproduct.

The organic radicals represented by $R_1$ and $R_2$ may be alkyl radicals, e.g., methyl, ethyl, propyl butyl, octyl, dodecyl, and octadecyl; aryl-radicals, e.g., phenyl, diphenyl and naphthyl; alkenyl radicals, e.g. vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, a-phenyl ethyl, B-phenylethyl and a-phenylbutyl; and the halo substituted radicals enumerated above.

The hydroxylated organo biproduct is removed and the resin/fluid copolymer is cured in the presence of atmospheric moisture. This copolymer provides a release agent having excellent release properties. The release agent has potentially unlimited shelf stability in closed containers. Cure is possible only when moisture is present as upon exposure to atmospheric moisture.

Specifically, the resin/fluid copolymer may be used in the following applications: pressure/molding; laminating; reinforced plastic; polyester resin and injection; rotational molding; fiberglass laminates; injection molding; tire manufacture; foundry; and electronic, electrical applications. The copolymer provides multiple releases and is non-transferable. There is no mold build-up and the resin is provided in a nonflammable solvent system. Most importantly, the copolymer has an unlimited storage stability in closed containers. The copolymer dries rapidly (less than 10 minutes at room temperature applications. However, for optimum performance, baking the coating after application is preferred. The copolymer is a water-white, thin liquid in solvent. In the absence of solvent it is a thick, semi-solid or solid clear resin, depending upon exact composition of the copolymer. It may be diluted in a Freon TF, butyl alcohol, or ethyl alcohol carrier. The copolymer will not flash and has a specific gravity of 1.4.

Examples of silicone fluids capable of utility in the instant invention system are Dow Corning Q-1-3563 (a hydroxylated polydimethylsiloxane), Mazer Chemical SF-R (a polydimethylsiloxane with terminal hydroxyl sites) and Union Carbide L-9000 (hydroxy-terminated (SiOH) dimethyl reaction fluid) Series.

The substituted silicone fluid having a variety of functionalities imparts specific desired character to the copolymer. For example, the fluid may include a methacyloxy functionality whereby the copolymer may be cured by ultraviolet irradiation. Alternatively, an amino functional fluid may be utilized to form a hard coating for plastics. Such coatings have been found to be highly abrasion resistant. Prior art coatings required adhesion promoters for basic plastics to promote adhesion. The copolymers including the amino functional fluid cure on the substrate in the presence of atmospheric moisture and do not require a separate primer. Additionally, primer may be added to the coating without reaction prior to exposure to atmospheric moisture.

Another application of the instant invention may be as a binder for paints and coatings. For example, silicone resin binders such as carbon black and chromate pigments are generally unstable. The resin may be stabilized pursuant to the instant invention.

Organo-silicone resins are generally difficult to emulsify. The organoalkoxy substituted silicone product of the instant invention is compatible with aliphatic solvents and may be mixed into an emulsion.

The organo-silicone resins used as starting materials may be in the form of a fluid wherein the resin is dissolved in a solvent such as toluene or may be in the form of a solid. When the organo-silicone resin is in the form of a solid, the resin is dissolved in a solvent prior to reacting the organo-silicone resin with alkoxysilane. The solvent is an alcohol which may be selected from the group consisting of methanol, ethanol, normal propanol and isopropanol.

The organo-silicone resin is reacted with the alkoxysilane at a ratio of 1 molar hydroxyl of the organo-silicone resin to 1 molar alkoxysilane. This provides an excess of alkoxy moieties derived from the alkoxy silane. The reaction of the alkoxy substituted product with the silicone fluid is carried out with excess alkoxy substituted product in relation to the silicone fluid.

The instant invnetion provides a novel product consisting of an organo-alkoxy substituted silicone resin. The product essentially masks the reactive sights of the silicone resin while in a moisture free atmosphere thereby providing a novel product having an effectively indefinite shelf life. The product may be reacted with a variety of silicone fluids as discussed above and then stored in the inert atmosphere until application. Upon application, in the presence of atmospheric moisture, the coating is cured.

EXAMPLE I

Under a nitrogen atmosphere, 100 grams of Owen Illinois type 650 glass resin is dissolved in 100 grams ethyl alcohol (anhydrous). 25 grams of ethyl alcohol, 1 gram of tetraisopropyltitanate (Kay Fries), and 13 grams of $Me_2Si(OEt)_2$ are charged to a stirred flask. The flask is heated to approximately 80°. 50 grams of the Owen Illinois—650/ethyl alcohol mixture are added to the flask slowly over 15 minutes, maintaining the mixture at 80°. The resulting solution is clear. 3 grams of Union Carbide L9000 are added to the solution and held at 80° C. for 15 minutes. 1 gram Kay-Fries DAMO silane (n-Aminoethylaminopropyl trimethoxy Silane) is added to the mixture and the mixture is cooled. The final product is a turbid liquid which must be agitated before use. The solution was adjusted to 100 grams by adding PM4084 (Anhydrous Ethyl Alocohol—Ashland Chemical), then 50 grams of n-butyl alcohol was added. The net weight is 150 grams of solution.

15 grams of the solution were added to 135 grams of Freon TF. The product is a clear liquid containing 1.66% of the Owen Illinois 650 resin as modified.

Tests using the final product as a release agent on a watch glass (baked 45 minutes at 300° F.) showed excellent release with a two component epoxy resin system. Tests using a plaque mold and two component polyurethane also showed excellent release and no apparent transfer of the release agent.

EXAMPLE II

Experiment to prepare methoxy functional silicone resin by reacting Owen Illinois OI-650 resin with (MTMS) Methyltrimethoxy Silane.

The following ingredients were combined:
OI-650 resin (10% OH) 100 grams
Ethyl Alcohol (Anhydrous) 100 grams
MTMS (Kay-Fries) 80 grams
Catalyst-Tetraisopropyl titanate (TIPT) (Kay-Fries) 1 gram A small sample of the mixture was analyzed by infrared spectrometry after evaporating the volatiles. The infrared spectrometry showed strong OH absorption from 3200 to 3600 $cm^{-1}$.

The mixture was heated to 80° C. under nitrogen and 1 gram of the TIPT catalyst was added. The mixture was then incubated for two hours.

Upon completion of the reaction, another infrared spectrophotometric analysis was made after evaporation of the volatiles. The infrared analysis showed no OH absorption indicating completion of the reaction.

EXAMPLE III

This experiment was carried out to determine the feasibility of reacting OI-650 glass resin with Kay-Fries methacryloxy-functional silicone resin for plastic hard coatings.

OI-650 glass resin was dissolved in ethanol (Ashland Chemical) at a 50/50 wt/wt ratio. The following was charged into an Erlenmeyer flask and then heated to 80° C.;
  150 grams isopropylalcohol (Ashland)
  49 grams MEMO silane (Kay-Fries)
  1.7 grams TIPT (Kay-Fries).
66.7 grams of the OI-650/ethanol solution were added to the flask with stirring and held at 80° C.

The product was hazy and grainy.

EXAMPLE IV

The following was charged to Erlenmeyher flask and heated to 80° C.;
  49 grams MEMO (Kay-Fries) (Methacryloxypropyl-trimethoxy silane)
  156 grams ethanol (Form C-USI)
  1 gram M & T T-12 (Tin catalyst) $[(C_4H_9)_2Sn(O_2C_{12}H_{23})_2]$.

66.7 grams of the Owen Illinois 650 ethanol mixture from Example III was added to the solution. The mixture was heated 15 minutes resulting in a clear liquid.

0.5 grams of TIPT was added. A yellow gel was formed which redissolved after 5 minutes of further incubation. Adding another 0.2 grams of TIPT caused no additional charge indicating that all of the hydroxyl groups had reacted.

The product was clear and had no signs of gelling particles.

EXAMPLE V 1000 grams OI-650 were mixed with 1000 grams ethyl alcohol (USI-formula-C). The following was charged to a 5 liter flask equipped with agitator, condensor, and thermometer under nitrogen; 800 grams MeSi(OMe)$_3$ (Mazer); and 2000 grams of OI-650—ethanol mixture. The mixture was heated to 80° C. 7 grams of TIPT (Kay-Fries) was added and held at 80° C. for 30 minutes. An additional 1 gram of TIPT was added with no additional clouding showing the reaction to be complete. 20 grams of water was added and refluxed 15 minutes. The product was a clear liquid. The reaction product was set up for atmospheric distillation of the alcoholic volatiles. After distillation, the following yields were calculated:
  fluid before stripping 3078 grams
  fluid after stripping 9120 grams
  volatiles removed (calculated) 1158 grams
  volatiles (actual) 1043 grams.
Finished fluid was clear, yellow liquid.

EXAMPLE VI

Owen-Illinois OI-650 glass resin was reacted with MeSi(OMe)$_3$ in methanol solvent.

The following was combined and heated to 40° C.:
  700 grams OI-650
  650 grams MeSi(OMe)$_3$ (Mazer)
  700 grams methanol (Ashland Chemical)
  1 gram of TIPT (Kay-Fries) was added and heated to reflux and held for 1 hour. TIPT was added and the solution refluxed until the addition of further TIPT caused no further gelling.

EXAMPLE VII

Under nitrogen, the following was combined:
  1000 grams toluene
  500 grams OI-650
  418 grams methyl triethyoxysilane (MTES-pure Owen Illinois).

200 parts of the above mixture were mixed with one part M & T T-12 forming a gel which was heated to reflux.

EXAMPLE VIII

The following was combined:
  700 grams OI-650 resin
  560 grams MeSi(OMe)$_3$ (Mazer Chemical)
  700 grams methyl alcohol (Ashland Chemical)

The combination was mixed to dissolve the resin. Three grams of TIPT were added followed by 700 grams of heptane. The mixture was reflexed for one hour. There was no change in the OH content by infrared spectrometry indicating no reaction. Refluxing into a D-S trap with water in the lower half removes all alcohols from the mixture and drives the reaction to completion.

The finished solution of modified resin in heptane weighed 1,358 grams. Infrared spectrometry showed no OH functionality confirmed by excellent shelf stability even when tin catalyst or amine silanes were added.

EXAMPLE IX

An epoxy functional OI-650 glass resin was prepared as a hard coating for plastics.

The following was charged to a flask:
  250 grams isopropyl alcohol 99% (Scientific Products)
  10 grams TIPT (Kay-Fries)
  280 grams GLYMO silane (Kay-Fries) (Glycidyloxypropyltrimethoxy Silane).

250 grams of OI-650 was dissolved in 250 grams Ashland PM-4084 anhydrous ethanol. The isopropyl alcohol mixture was heated to 80° and the OI-650 mixture was added thereto over a two hour period. The final product was mixed until clear and then held at reflex at 80° C. for two hours. The solution was cooled and isopropyl alcohol was added to balance the alcohol loss during evaporation.

EXAMPLE X

A water based version of the instant invention for applications on hot molds (above 100° F.) was made by the following formulation:
  250 grams of OI-650 resin were dissolved in anhydrous ethanol PM-4084 (Ashland Chemical).
  250 grams of ME$_2$ SiOET$_2$ and 10 grams of TIPT (Kay-Fries) were stirred in a flask under nitrogen and heated to 80° C. The two mixtures were combined over a 60 minute period and held of 60 minutes at 80° C. Twenty-four grams of L-9000 (8000) hydroxyfunctional fluid were added to the mixture and held for 60 minutes at 80° C. and cooled. 342 grams of solvent LR(OMS-Ashland) were added to the solution. The solution was emulsified in Igepal C0850 5.6 grams, Igepal C0530 3.5 grams, and water, 4.75 grams, each emulsion being of good quality. Igepal C0850 and Igepal C0530 are non-ionic surfactants commonly used as emulsifiers for silicones.

What is claimed is:

1. A method of preparing an organoalkoxy substituted silicone resin consisting essentially of the steps of: adding an organo-silicone resin that is a three dimensional trifunctional siloxane polymer with each silicone atom sharing three oxygen atoms with adjacent silicon atoms and having hydroxyl-terminated functional groups, to an alkoxysilane wherein the ratio of resin contributed moles of hydroxyl groups to alkoxysilane containing molecules is at least 1:1 in the presence of catalytic amounts of a titanate compound and incubating the mixture until there is complete substitution of the hydroxyl groups with alkoxy moieties from the alkoxysilane to derive the stable organoalkoxy substituted silicone product absent any free hydroxyl groups having extended shelf life and a hydroxylated biproduct.

2. A method as set forth in claim 1 further defined as reacting the organo-silicone resin and alkoxysilane under a moisture free atmosphere.

3. A method as set forth in claim 2 further defined as reacting the organo-silicone resin and alkoxysilane in a nitrogen atmosphere.

4. A method as set forth in claim 2 including the steps of removing the biproduct from the organoalkoxy substituted silicone product and curing the organoalkoxy substituted product in the presence of atmospheric moisture.

5. A method as set forth in claim 2 including the step of reacting the organoalkoxy substituted silicone product in the presence of catalytic amounts of a titanate compound with a hydroxy functional fluid corresponding to the formula:

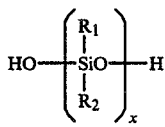

wherein $R_1$ and $R_2$ are monovalent organic radicals selected from the group consisting of aliphatic and aromatic hydrocarbon organic radicals and mixtures thereof and x is an integer from 10 to 100 to derive a resin/fluid copolymer and a hydroxylated organo-biproduct.

6. A method as set forth in claim 5 including the steps of removing the hydroxylated organo-biproduct and curing the copolymer resin/fluid in the presence of atmospheric moisture.

7. A method as set forth in claim 2 including the step of mixing the organoalkoxy substituted silicone resin with an aliphatic solvent and emulsifying the mixture to derive an emulsion.

8. A method as set forth in claim 2 further including the step of reacting the organo-silicone resin and the alkoxysilane in the presence of heat.

9. A method as set forth in claim 8 further defined as reacting the organo-silicone resin and the alkoxysilane at a temperature of between 50° C. to 90° C.

10. A method as set forth in claim 1 wherein said organo-silicone resin is solid, said method further including the steps of dissolving the organo-silicone resin in a solvent prior to reacting the organo-silicone resin with the alkoxysilane.

11. A method as set forth in claim 10 wherein said solvent is an alcohol.

12. A method as set forth in claim 11 wherein said alcohol is selected from the group consisting of methanol, ethanol, normal propanol and isopropanol.

13. A method as set forth in claim 1 further defined as reacting the organo-silicone resin with the alkoxysilane at a ratio of one molar hydroxyl of the organo-silicone resin to one molar alkoxysilane.

14. A method as set forth in claim 1 further defined as the titanate being a tetraorthotitanate.

15. An organoalkoxy substituted silicone resin made from the process consisting essentially of adding an organo-silicone resin that is a three dimensional trifunctional siloxane polymer with each silicone atom sharing three oxygen atoms with adjacent silicon atoms and having hydroxyl-terminated functional groups, to an alkoxysilane in the presence of a catalytic amounts of a titanate compound until at least 1:1 molar ratio is reached between the hydroxyl groups of the resin and the alkoxy silane molecules, and incubating the mixture until there is complete substitution of the hydroxyl groups with alkoxy moieties from the alkoxysilane to derive the organoalkoxy substituted silicone resin as a product having an extended shelf life absent any hydroxyl groups and a hydroxylated biproduct.

* * * * *